US010975980B2

(12) United States Patent
Lemmers, Jr.

(10) Patent No.: US 10,975,980 B2
(45) Date of Patent: Apr. 13, 2021

(54) GOVERNOR FLYWEIGHT ASSEMBLIES

(71) Applicant: Hamilton Sundstrand Corporation, Charlotte, NC (US)

(72) Inventor: Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 67 days.

(21) Appl. No.: 16/285,777

(22) Filed: Feb. 26, 2019

(65) Prior Publication Data

US 2020/0271239 A1   Aug. 27, 2020

(51) Int. Cl.
| | | |
|---|---|---|
| *G01P 3/00* | (2006.01) | |
| *F16K 31/44* | (2006.01) | |
| *G05D 13/08* | (2006.01) | |
| *G01P 3/487* | (2006.01) | |
| *G05D 13/10* | (2006.01) | |

(52) U.S. Cl.
CPC ............. *F16K 31/44* (2013.01); *G05D 13/08* (2013.01); *G01P 3/487* (2013.01); *G05D 13/10* (2013.01); *Y10T 137/108* (2015.04)

(58) Field of Classification Search
CPC ........................ Y10T 137/108; Y10T 137/1135
See application file for complete search history.

(56) References Cited

U.S. PATENT DOCUMENTS

| | | | |
|---|---|---|---|
| 2,890,877 A * | 6/1959 | Straznickas ............ | G05D 13/10 73/514.39 |
| 3,370,600 A | 2/1968 | Peterson | |
| 3,751,993 A * | 8/1973 | Davis ........................ | G01P 1/10 73/514.39 |
| 3,831,615 A * | 8/1974 | Hartzell .................. | B64C 11/50 137/53 |
| 4,869,106 A | 9/1989 | Metcalf et al. | |
| 8,823,331 B2 | 9/2014 | Lovejoy | |

FOREIGN PATENT DOCUMENTS

GB        1143852 A    2/1969

OTHER PUBLICATIONS

Extended European Search Report dated Mar. 11, 2020, issued during the prosecution of European Patent Application No. EP 19211153.2.

* cited by examiner

*Primary Examiner* — Robert K Arundale
(74) *Attorney, Agent, or Firm* — Locke Lord LLP; Joshua L. Jones; Scott D. Wofsy

(57) ABSTRACT

A flyweight system includes a base defining a through-bore for connection to a flyweight governor. The base defines a track therein. A magnet is seated in the track of the base. A tab is mounted to the base, sandwiching the magnet between the base and the tab to retain the magnet in the track.

14 Claims, 2 Drawing Sheets

GOVERNOR FLYWEIGHT ASSEMBLIES

BACKGROUND OF THE INVENTION

1. Field of the Invention

The present disclosure relates to flyweights, and more particularly to flyweights for governor assemblies such as used in Integrated Drive Generators (IDGs) or the like.

2. Description of Related Art

IGDs use governor flyweight assemblies with magnetic flyweights. The flyweights use a soldered joint to connect an alnico magnet to a low alloy base or toe. Typically, the solder material for joining these components includes cadmium or gold. The magnetic flyweight is used to control a valve. As the flyweights revolve, a magnetic field from voltage applied to a coil interacts with the alnico magnets to control the swing position of the flyweights. The flyweights are connected through a linkage to a linear valve so that the swing position of the flyweights determines the valve position to control the amount of flow, e.g., flow of transmission oil, through the valve. For example, the further outward the flyweights swing, the less is the oil flow to the transmission, and the further inward the flyweights swing, the greater is the oil flow to the transmission.

The conventional techniques have been considered satisfactory for their intended purpose. However, there is an ever present need for improved governor flyweight assemblies. This disclosure provides a solution for this need.

SUMMARY OF THE INVENTION

A flyweight system includes a base defining a through-bore for connection to a flyweight governor. The base defines a track therein. A magnet is seated in the track of the base. A tab is mounted to the base, sandwiching the magnet between the base and the tab to retain the magnet in the track.

The magnet can be devoid of solder joining it to the base and tab. The tab can be mounted to the base with a bolt extending through the tab and in threaded engagement with the base. The base can include hardened steel. The tab can include low alloy steel. The magnet can be a permanent magnet that includes samarium-cobalt.

The through-bore can run along a pivot axis, and the track can define an open channel defined in the base along a direction parallel to the pivot axis. The through-bore can be mounted through a bearing to an axle extending along the pivot axis.

A control horn can extend from the base, wherein the control horn is connected to a linkage of a flyweight governor. A linear actuated valve can be connected to the linkage for linear change of position of a valve member of the linear actuated valve as a function of swing position of the base. At least one additional flyweight can be operatively connected to the flyweight governor for cooperative actuation of the linear actuated valve, wherein the flyweights are arranged to revolve about a revolution axis. The linear actuated valve can be in fluid communication between a fluid source and a transmission for control of flow rate between the fluid source and the transmission. A generator can be connected to the transmission, wherein the transmission is configured to drive the generator given prime mover input to the transmission. The transmission can be configured to drive the generator at a relatively constant rate given variable input rate form the prime mover. The transmission can be connected to the flyweight governor to revolve the flyweights about the revolution axis.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
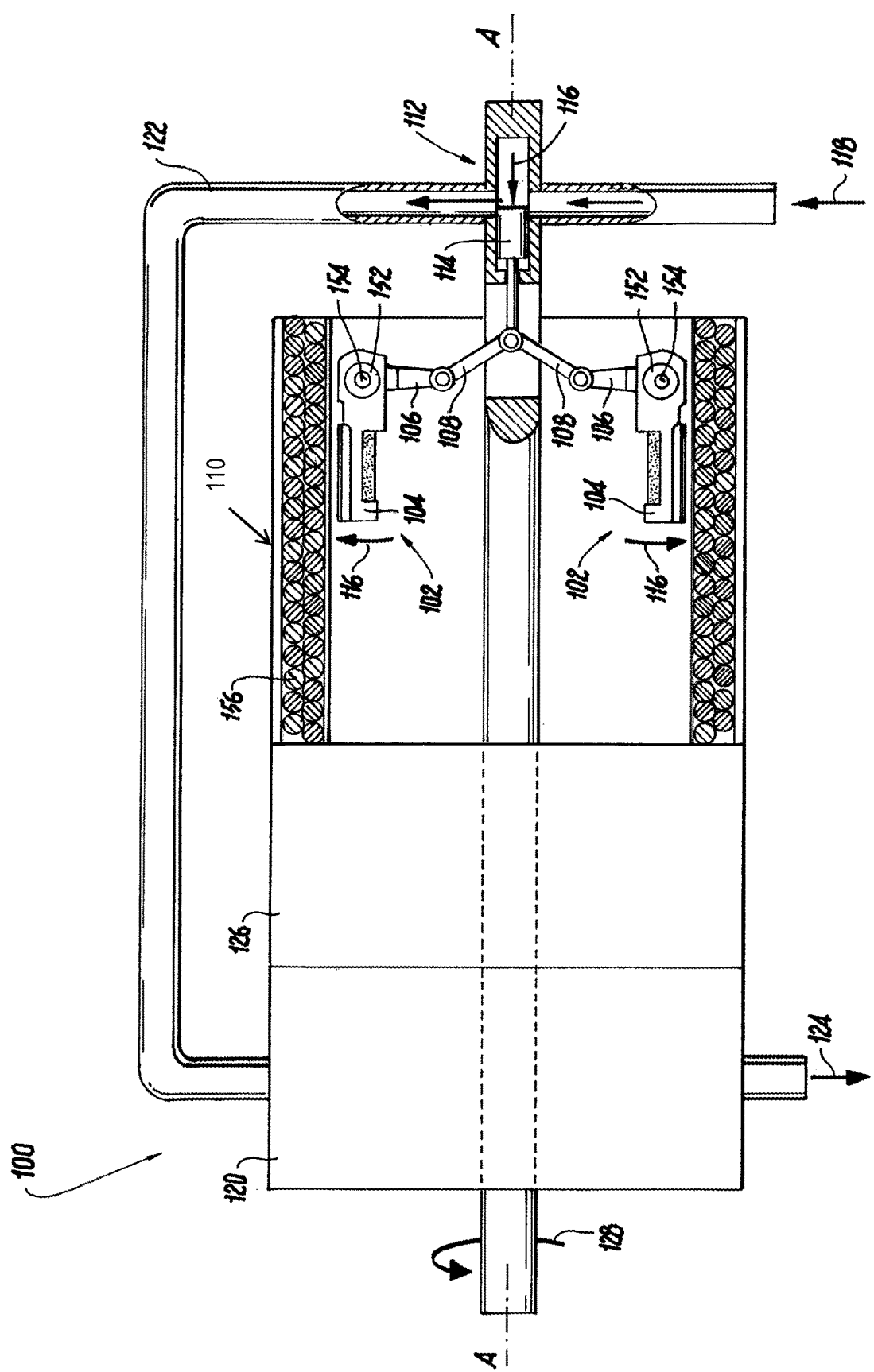
FIG. 1 is a schematic view of an exemplary embodiment of a system constructed in accordance with the present disclosure, showing a generator, transmission, and a flyweight system connected so the flyweights can govern fluid flow to the transmission.

Reference will now be made to the drawings wherein like reference numerals identify similar structural features or aspects of the subject disclosure. For purposes of explanation and illustration, and not limitation, a partial view of an exemplary embodiment of a flyweight system in accordance with the disclosure is shown in FIG. 1 and is designated generally by reference character 100. Other embodiments of systems in accordance with the disclosure, or aspects thereof, are provided in FIGS. 2-3, as will be described. The systems and methods described herein can be used for governing flow, e.g., of transmission fluids in Integrated Drive Generators (IDGs).

The flyweight system 100 includes a plurality of flyweights 102. Each flyweight 102 includes a base 104. A control horn 106 extends from the base 104. The control horn 106 is connected to a linkage 108 of the flyweight governor 110. A linear actuated valve 112 is connected to the linkage 108 for linear change of position of a valve member 114 of the linear actuated valve 112 as a function of swing position of the base 104, as indicated in FIG. 1 by the three arrows 116. The flyweights 102 cooperate in actuation of the linear actuated valve 112 as the flyweights 102 revolve about a revolution axis A. The linear actuated valve 112 is in fluid communication in a flow line 122 between a fluid source, indicated by source arrow 118 in FIG. 1, and a transmission 120 for control of flow rate between the fluid source 118 and the transmission 120. Fluid can flow out of the transmission 120 as indicated by arrow 124, e.g. to return to the source 118 such as a sump. A generator 126 is connected to the transmission 120, wherein the transmission 120 is configured to drive the generator 126 given input from a prime mover, indicated schematically by arrow 128 in FIG. 1, to the transmission 120. The transmission 120 is configured to drive the generator 126 at a relatively constant rate given variable input rate form the prime mover 128. The transmission 120 is connected to the flyweight governor 110 to revolve the flyweights 102 about the revolution axis A.

Figure 2:
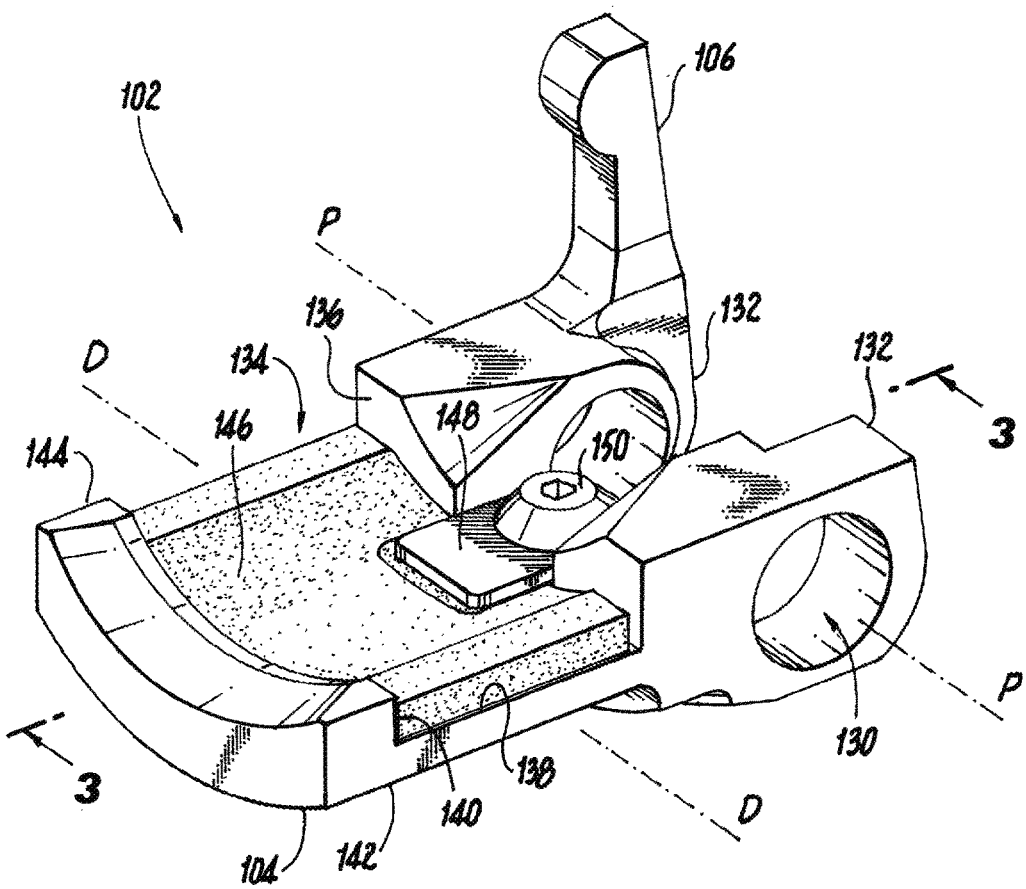
FIG. 2 is a perspective view of one of the flyweights of FIG. 1, showing the magnet seated in the track.

With reference now to FIG. 2, the base 104 of each flyweight 102 defines a through-bore 130 passing through a pair of tines 132 for connection of the base to the flyweight governor 110 shown in FIG. 1. The base 104 defines a track 134 therein, which includes an open channel defined by surfaces 136, 138, and 140 of the base 104 that is open on the top 144, and the lateral sides 142 of the base as oriented in FIG. 2. A magnet 146 is seated in the track 134 of the base 104. The through-bore 130 runs along a pivot axis P, and the track 134 defines the open channel running in the base 104 along a direction D parallel to the pivot axis P. The through-bore 130 is mounted through a bearing 152 to an axle 154 extending along the pivot axis P, as shown schematically in FIG. 1.

Figure 3:
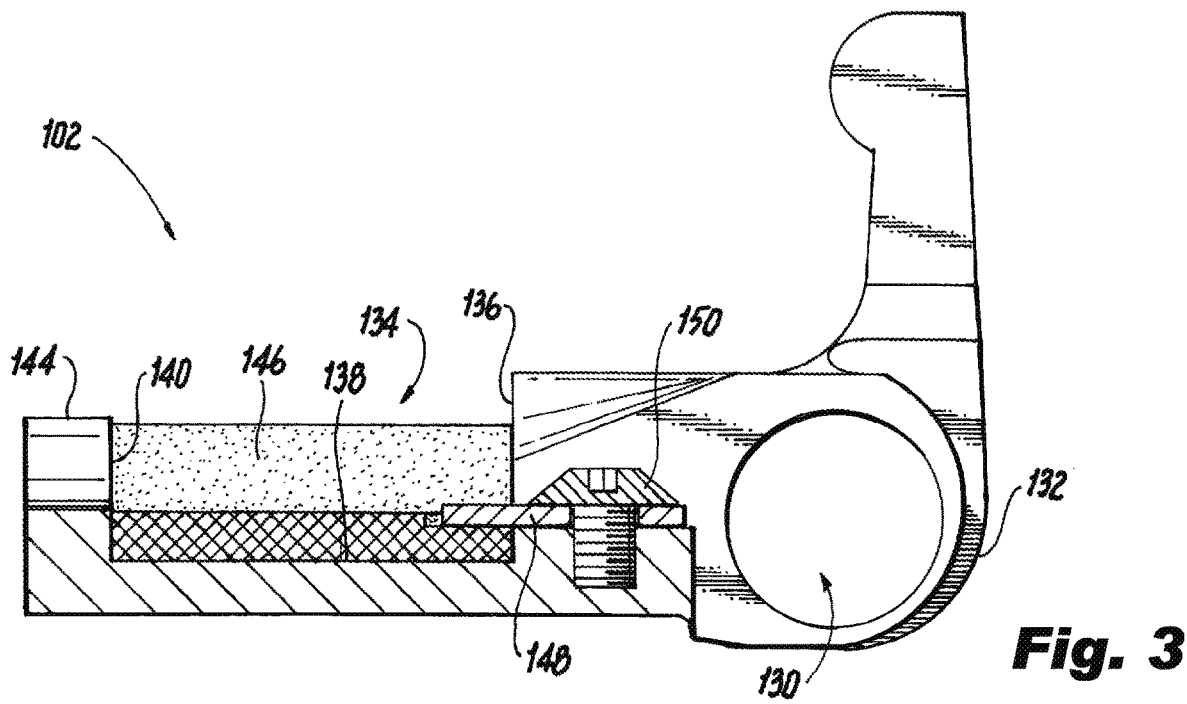
FIG. 3 is a cross-sectional side elevation view of the flyweight of FIG. 2, showing the magnet sandwiched between the base and the tab without solder.

With reference to FIG. 3, a tab 148 is mounted to the base 104, sandwiching the magnet 146 between the base 104 and the tab 148 to retain the magnet 146 in the track 134 without any need for solder joining the magnet 146 to the base 104 and tab 148. The tab 148 is mounted to the base 104 with a bolt 150 extending through the tab 148 and in threaded engagement with the base 104. Eliminating solder also allows elimination of costly or problematic solder constituents such as gold or cadmium.

The base 104 can include hardened steel (hardened relative to the tab 148), and the tab 148 can includes low alloy steel (low alloy relative to the base 104). The permanent magnet can include samarium-cobalt.

Referring again to FIG. 1, the coils 156 in the flyweight governor 110 can generate a magnetic field from a voltage applied to the coils 156. The magnetic field determines the swing position, indicated by the arrows 116 in FIG. 1, of the flyweights 102, allowing control of fluid flow to the transmission.

The methods and systems of the present disclosure, as described above and shown in the drawings, provide for flyweight systems with superior properties including elimination of solder from the flyweights. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A flyweight system comprising:
   a base defining a through-bore for connection to a flyweight governor, wherein the base defines a track therein;
   a magnet seated in the track of the base; and
   a tab mounted to the base, sandwiching the magnet between the base and the tab to retain the magnet in the track, wherein the tab is mounted to the base with a bolt extending through the tab and in threaded engagement with the base.

2. The flyweight system as recited in claim 1, wherein the magnet is devoid of solder joining it to the base and tab.

3. The flyweight system as recited in claim 1, wherein the base includes hardened steel, relative to the tab.

4. The flyweight system as recited in claim 1, wherein the tab includes low alloy steel relative to the base.

5. The flyweight system as recited in claim 1, wherein the magnet is a permanent magnet that includes samarium-cobalt.

6. A flyweight system comprising:
   a base defining a through-bore for connection to a flyweight governor, wherein the base defines a track therein;
   a magnet seated in the track of the base; and
   a tab mounted to the base, sandwiching the magnet between the base and the tab to retain the magnet in the track, wherein the through-bore runs along a pivot axis, and wherein the track defines an open channel defined in the base along a direction parallel to the pivot axis.

7. The flyweight system as recited in claim 6, wherein the through-bore is mounted through a bearing to an axle extending along the pivot axis.

8. A flyweight system comprising:
   a base defining a through-bore for connection to a flyweight governor, wherein the base defines a track therein;
   a magnet seated in the track of the base; and
   a tab mounted to the base, sandwiching the magnet between the base and the tab to retain the magnet in the track, further comprising a control horn extending from the base, wherein the control horn is connected to a linkage of a flyweight governor.

9. The flyweight system as recited in claim 8, further comprising a linear actuated valve connected to the linkage for linear change of position of a valve member of the linear actuated valve as a function of swing position of the base.

10. The flyweight system as recited in claim 9, wherein the base, magnet, and tab comprise a first flyweight and further comprising at least one additional flyweight for being operatively connected to the flyweight governor for cooperative actuation of the linear actuated valve, wherein the flyweights are arranged to revolve about a revolution axis.

11. The flyweight system as recited in claim 10, wherein the linear actuated valve is in fluid communication between a fluid source and a transmission for control of flow rate between the fluid source and the transmission.

12. The flyweight system as recited in claim 11, further comprising a generator connected to the transmission, wherein the transmission is configured to drive the generator given prime mover input to the transmission.

13. The flyweight system as recited in claim 12, wherein the transmission is configured to drive the generator at a relatively constant rate given variable input rate form the prime mover.

14. The flyweight system as recited in claim 13, wherein the transmission is connected to the flyweight governor to revolve the flyweights about the revolution axis.

* * * * *